March 11, 1941.  F. E. CREVER ET AL  2,234,747

ELECTRIC REGULATOR

Filed May 7, 1940

Inventors:
Frederick E. Crever,
James R. Kilander,
by Harry E. Dunham
Their Attorney.

Patented Mar. 11, 1941

2,234,747

UNITED STATES PATENT OFFICE 2,234,747

ELECTRIC REGULATOR

Frederick E. Crever and James R. Kilander, Schenectady, N. Y., assignors to General Electric Company, a corporation of New York Application May 7, 1940, Serial No. 333,786

11 Claims. (Cl. 171—223)

Our invention relates to electric regulators and more particularly to electric regulators for dynamo-electric machines.

In the control of an electrical condition, such as the output voltage of the dynamo-electric machine, it is frequently desirable to not only control the magnitude of the voltage which is to be maintained but also to provide means which permits a wide range of control of the voltage which is maintained. In accordance with the teachings of our invention described hereinafter, we provide a new and improved regulating system capable of maintaining an electrical condition, such as voltage, within narrowly defined limits, and which permits a greater latitude in adjustment of the voltage than that afforded by the prior art arrangements.

It is an object of our invention to provide a new and improved electric regulator.

It is another object of our invention to provide a new and improved regulator for dynamo-electric machines.

It is a further object of our invention to provide a new and improved electronic voltage regulator for dynamo-electric machines.

Briefly stated, in the illustrated embodiment of our invention we provide an electric regulator for controlling the voltage of a dynamo-electric machine, such as a direct current generator, and which comprises an armature reaction excited type of exciter and an electronic regulator for variably energizing the field winding of the generator. The electronic voltage regulator and associated voltage responsive circuit control the exciter so that the output voltage of the generator is maintained at a precisely defined value, and the voltage regulating circuit is susceptible of adjustment to establish a wide range of voltage control.

Figure 1:
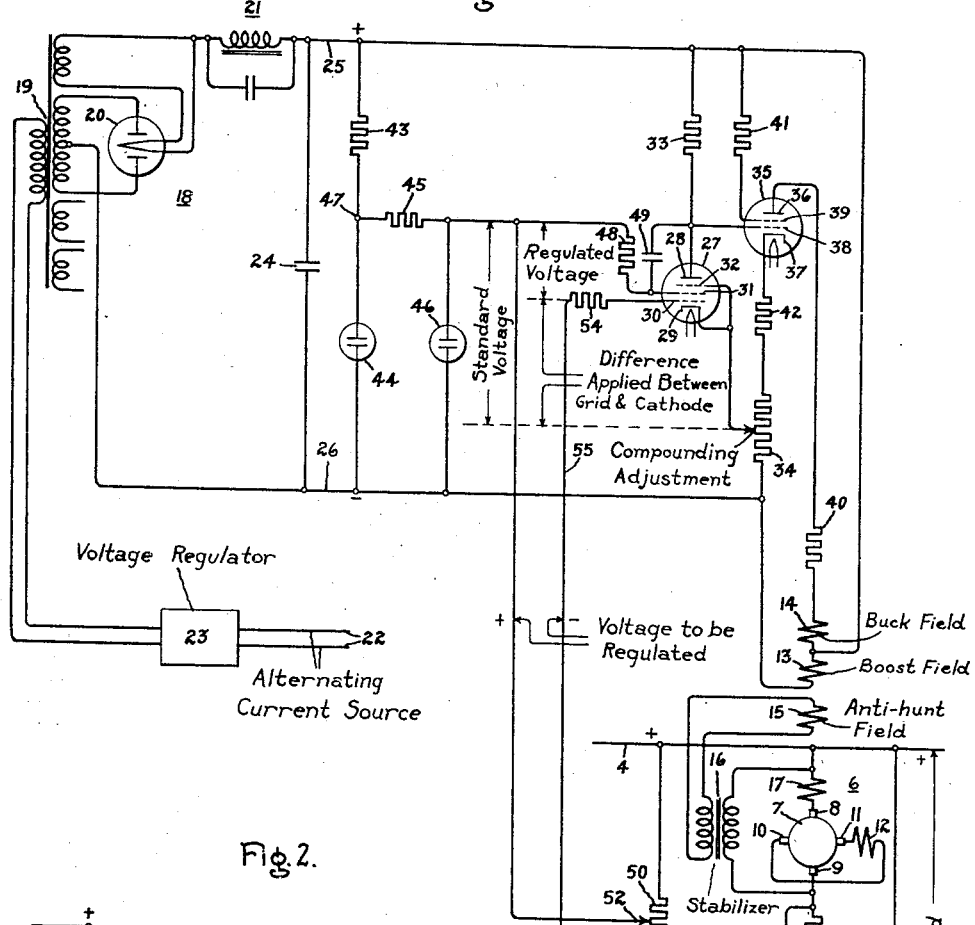
Figure 2:
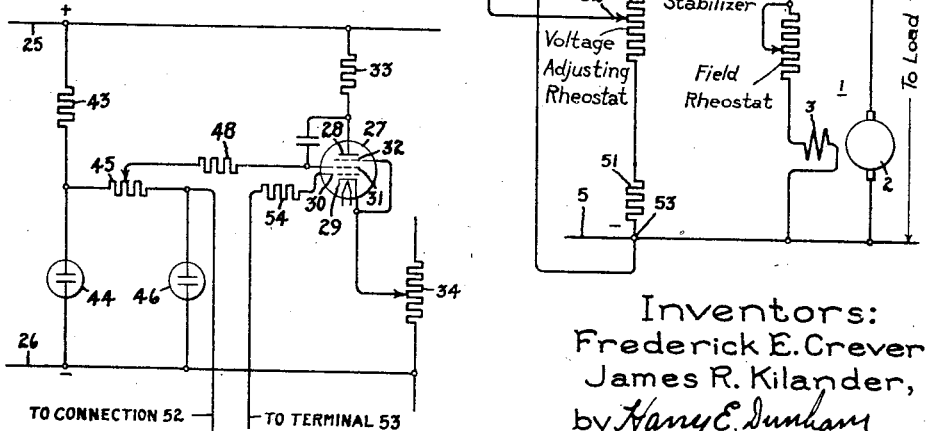

For a better understanding of our invention, reference may be had to the following description taken in connection with the accompanying drawing, and its scope will be pointed out in the appended claims. Fig. 1 of the drawing diagrammatically illustrates an embodiment of our invention as applied to a system for regulating the output voltage of a direct current generator. Fig. 2 diagrammatically illustrates a modification of the arrangement shown in Fig. 1.

Referring now to Fig. 1 of the drawing, we have there illustrated our invention as applied to a system for regulating an electrical condition, such as the output voltage of a direct current generator 1 comprising an armature 2 and having a field winding 3. The armature winding 2 is connected across a load circuit comprising a positive conductor 4 and a negative conductor 5.

We provide an auxiliary dynamo-electric machine or exciter 6 which is of the armature reaction excited type for variably energizing the field winding 3 of generator 1. The armature reaction excited machine 6 comprises an armature 7 and is provided with two sets of brushes 8 and 9, and 10 and 11; one set of brushes, including brushes 10 and 11, is connected through a relatively low resistance circuit to provide a path for the short circuit current which produces one component of the flux of the machine. The cross magnetization field winding 12 is connected in this circuit. The other set of brushes, including brushes 8 and 9, produces a voltage which varies in response to a resultant energization of a pair of field windings 13 and 14. Field winding 13 may be termed the boosting field and field winding 14 may be termed the bucking field, the resultant energization thereof determines the voltage appearing across brushes 8 and 9 and hence determines the energization of field winding 3 of direct current generator 1. The armature reaction excited machine 6 amplifies the variations in current transmitted to the bucking field 14. Machine 6 may also be provided with an antihunting field 15 which is energized through a transformer 16 in response to variations in the output voltage of machine 6. A series field 17 may also be used in the machine 6. Certain features of the dynamo-electric machine 6 are disclosed and claimed in a copending application Serial No. 281,008 of E. F. W. Alexanderson and M. A. Edwards, filed June 24, 1939, and which is assigned to the assignee of this application.

In order to provide a source of direct current of substantially constant voltage, we provide a rectifier, such as a biphase rectifier 18, comprising a transformer 19, an electric valve 20 and a filter circuit 21 energized from a suitable source of alternating current 22. A voltage regulator 23 is connected between the rectifier 18 and the source of alternating current 22 so that the voltage supplied to the transformer 19, and hence the output voltage of the rectifier, is maintained constant irrespective of variations in the alternating voltage. A filtering capacitance 24 may be connected across the output terminals 25 and 26 of the rectifier 18.

The boosting field 13 of the armature reaction excited machine 6 is connected directly across the direct current source including conductors 25 and 26, and hence is energized by a substantially constant direct current. As a means for variably energizing the bucking field 14 and hence as a means for controlling the resultant magnetomotive force of windings 13 and 14 in response to a predetermined controlling influence, we provide means including an electric discharge device 27. The electric discharge device 27 is preferably of the high vacuum type having an anode 28, a cathode 29 and may comprise a control grid 30, a screen grid 31 and a suppressor grid 32. The anode-cathode circuit of the discharge device 27 is connected across conductors 25 and 26 through a resistance 33 and an adjustable resistance 34, the function of which will be explained hereinafter. Electric discharge device 27 conducts variable amounts of unidirectional current through resistance 33, thereby controlling the conductivity of a second electric discharge device 35 which transmits variable amounts of unidirectional current to the bucking field 14 from the output circuit of rectifier 18. Electric discharge device 35 is also preferably of the high vacuum type having an anode 36, a cathode 37, a control grid 38 and a screen grid 39. A suitable current limiting resistance 40 may be connected in series relation with the discharge device 35 so that the current transmitted through this device is always limited to a safe value. Control grid 38 of discharge device 35 is connected in circuit with discharge device 27 and resistance 33 so that its potential varies in response to the current conducted through discharge device 27. Screen grid 39 is connected to the positive terminal 25 of the direct current source through a resistance 41, thereby introducing into discharge device 35 an additional means for compensating for any variations in the voltage of the direct current circuit. Another resistance 42 may also be connnected in series relation with resistance 41 and the anode-cathode circuit of discharge device 35. Resistance 34 permits control or adjustment of the voltage compounding of the direct current generator 1.

We provide an improved circuit for precisely controlling the current conducted by the electric discharge device 27 to maintain precisely the output voltage of the direct current generator 1. A voltage divider comprising a serially connected resistance 43 and a glow discharge device 44 are connected across the direct current source to provide a standard or reference voltage of precisely constant magnitude against which a predetermined component of the output voltage of generator 1 acts to control discharge device 27. We also provide another voltage divider including a resistance 45 and a glow discharge device 46 connected between the common juncture 47 of resistance 43 and glow discharge device 44. In this manner we increase the precision or accuracy of the reference voltage which is obtained. One of the control members, such as screen grid 31 of electric discharge device 27, is connected to the common juncture of resistance 45 and glow discharge device 46, or to the common juncture 47 through a resistance 48. A suitable transient voltage absorbing means, such as a capacitance 49, may be connected between screen grid 31 and the anode 28 to prevent transient conditions from affecting the regulating operation of discharge device 27.

A voltage divider, including resistance 50 and a resistance 51, is connected across the armature 2 of direct current generator 1. A point 52 of relatively positive potential is connected to the positive terminal of electric discharge device 46. In addition, a point of relatively negative potential of this voltage divider, such as point 53, is connected to the control grid 30 through a resistance 54 and conductor 55.

The operation of the embodiment of our invention diagrammatically illustrated in Fig. 1 of the drawing will be explained by considering the system when the dynamoelectric machine 1 is operating as a direct current generator. The armature reaction excited exciter 6 transmits variable amounts of current to field winding 3 of generator 1 to control its output voltage. The exciter 6 produces a variable output or armature voltage in response to the resultant energization of field windings 13 and 14 thereof acting, in effect, as a current amplifier of the unidirectional current transmitted to the bucking field winding 14.

The electric discharge devices 27 and 35 operate as amplifiers to transmit variable amounts of unidirectional current to the bucking field winding 14 of exciter 6 in response to the output or armature voltage of direct current generator 1. The current conducted by the electric discharge device 27 varies inversely with the output voltage of the direct current generator 1 and transmits variable amounts of unidirectional current through the resistance 33 to raise or lower the potential of control grid 38 of discharge device 35. The variable amounts of current transmitted by the electric discharge device 35 are, of course, transmitted through the bucking field 14 to control the net or resultant magnetomotive force acting in the exciter 6 and thereby controls the energization of field winding 3. The manner in which the electric discharge devices 27 and 35 operate in response to variations of the armature voltage of generator 1 may be more fully explained as follows. Assuming that the armature voltage of the direct current generator 1 tends to rise above the pre-established or predetermined value, the potential of control grid 30 of discharge device 27 is lowered relative to the potential of cathode 29, thereby decreasing the current conducted by discharge device 27. Consequently, the current transmitted to resistance 33 will be decreased and the potential of control grid 38 of discharge device 35 will be raised due to the decreased voltage drop through resistance 33. Discharge device 35 consequently transmits a greater amount of current to the bucking field winding 14, thereby reducing the net or resultant magnetization of exciter 6, reducing its output voltage, and consequently decreasing the voltage of generator 1. Conversely, if the voltage of generator 1 tends to decrease, the system responds to decrease the energization of the bucking field 14 and raises the output voltage of the exciter 6 and restores the armature voltage of generator 1 to the desired or predetermined value.

Electric discharge device 27 responds accurately to slight variations in the magnitude of the armature voltage of generator 1 inasmuch as a difference in voltage between the component derived from the armature circuit of generator 1 and the voltage of glow discharge device 46 is impressed between the control grid 30 and cathode 29.

It is to be noted that the bucking field 14 is connected directly across the source of direct current and, hence, is always energized by a substantially constant direct current. In order to compensate for any variation of the voltage of the direct current source which might be present, the screen grid 39 of the discharge device 35 is connected to the positive conductor 25 of the source so that any tendency to increase current through the boosting field 13 also automatically introduces a compensatory increase of current through the bucking field 14 by virtue of the additional positive bias effective in electric discharge device 35.

When the system is initiated in its operation, inasmuch as the boosting field 13 is connected directly across the direct current source, the exciter 6 builds up the generator voltage immediately. At that time, the difference between the voltage to be regulated derived from the armature of generator 1 and the standard or reference voltage furnished by glow discharge device 46, will change the impedance of the discharge device 27, which, of course, operates as an amplifier, in such a manner as to allow current to flow through discharge device 35 and thus increase the excitation of the bucking field 14. Any increases or decreases in the energization of the bucking field 14 which are required thereafter are initiated automatically by the control system.

An important advantage afforded by the use of our invention in regulating systems is the increased range of control effected by the connection of the voltage divider of the direct current generator 1 and the glow discharge devices. Certain features of this voltage regulating circuit are disclosed and claimed in United States Letters Patent No. 2,031,509, granted February 18, 1936, upon an application of Harold T. Seeley, and which is assigned to the assignee of this application. By placing the glow discharge devices across a relatively constant source of direct current which is obtained from the full wave rectifier, there is no lower limit to the regulated voltage which may be maintained. By using this arrangement, it is possible to place a potentiometer directly across glow discharge device 46 and derive therefrom any value of standard voltage which might be required. That is, the voltage of the direct current generator 1 may be regulated to values as low as four or five volts without incurring unstable operation. The output or armature voltage of generator 1, which the system operates to maintain, may be adjusted or controlled by means of the rheostat 50. The type or amount of compounding obtained is established by adjustment of the resistance 34.

Fig. 2 diagrammatically illustrates a modification of the arrangement shown in Fig. 1. Instead of connecting the screen grid 31 of the discharge device 27 to the positive terminal of the glow discharge valve 46, it is connected to an adjustable contact of the resistance 45 of the voltage divider which is connected across the glow discharge valve 44. This arrangement makes it possible to dispense with the use of the voltage regulating means 23, shown in Fig. 1, inasmuch as the system automatically responds to variations in the magnitude of the voltage of the direct current source, including conductors 25 and 26, to vary the energization of the bucking field 14 thereby to compensate for variations in the energization of the boosting field 13 due to variations in the voltage of the source.

The embodiment of our invention shown in Fig. 2 operates in substantially the same way as that explained above in connection with the arrangement of Fig. 1. If it be assumed that the armature voltage of the generator 1 increases, the potential impressed on grid 30 of discharge device 27 is lowered effecting a rise in potential of grid 38 of electric discharge device 35, thereby increasing the energization of the bucking field and consequently decreasing the energization of the field winding 3 of generator 1. Conversely, if the armature voltage of generator 1 decreases, the system responds to raise the armature voltage to the desired value.

The arrangement of Fig. 2 also operates to effect compensatory changes in the energization of the bucking winding 14 occasioned by variations in the magnitude of the voltage of the direct current source thereby neutralizing variations in the energization of the boosting field 13 occasioned by such variations in the voltage of the source. For example, if the voltage of the source including conductors 25 and 26 rises, the potential impressed on screen grid 31 is lowered, thereby decreasing the current conducted by the electric discharge device 27 and raising the potential impressed on grid 38 of electric discharge device 35. Consequently, the current transmitted to the bucking field 14 by discharge device 45 will be increased to neutralize the increase in the energization of the boosting field 13 occasioned by the increase of the voltage of the source. In like manner, the system will respond to compensate for decreases in voltage of the source to maintain the desired relation or difference in the energization of the fields 13 and 14 for a particular value of a controlling influence, such as the component of voltage derived from the armature circuit of generator 1.

While we have shown and described our invention as applied to a particular system of connections and as embodying various devices diagrammatically shown, it will be obvious to those skilled in the art that changes and modifications may be made without departing from our invention, and we, therefore, aim in the appended claims to cover all such changes and modifications as fall within the true spirit and scope of our invention.

What we claim as new and desire to secure by Letters Patent of the United States is:

1. In combination, a dynamo-electric machine comprising a field winding, means comprising a dynamo-electric machine of the armature reaction excited type for exciting said field winding and comprising a pair of field windings connected to develop opposing magnetomotive forces, a source of alternating current, a rectifier having a constant voltage direct current output circuit, voltage regulating means connected between said source and said rectifier, means connected across said output circuit and comprising a voltage divider including a resistance and a glow discharge device, means responsive to a predetermined controlling influence derived from said first mentioned dynamo-electric machine for controlling the resultant energization of said pair of field windings and comprising an electronic discharge device having an anode, a cathode and at least two control members, means for connecting one of said control members to said voltage dividers, and means for impressing between said cathode and the other control member a voltage which varies in accordance with said predetermined controlling influence.

2. In combination, a dynamo-electric machine having an armature winding and a pair of field windings connected to develop opposing magnetomotive forces, a source of direct current, means for connecting one of said field windings directly across said source, means for variably energizing the other of said field windings to control the resultant magnetization of said machine and including an electric discharge device having an anode, a cathode and two grids, means for controlling the conductivity of said discharge device comprising a control circuit to produce a unidirectional voltage which varies in accordance with a predetermined controlling influence and having positive and negative terminals, means for connecting the negative terminal to one of said grids, a voltage divider connected to be energized from said source and comprising in series relation a resistance and a glow discharge valve, means for connecting the positive terminal of said control circuit to said voltage divider, and means for connecting the other grid to said voltage divider to control the conductivity of said electric discharge device in response to the magnitude of the voltage of said source.

3. In combination, a dynamo-electric machine comprising a field winding, means comprising a dynamo-electric machine of the armature reaction excited type for energizing said field winding and comprising a pair of field windings connected to develop opposing magnetomotive forces, a source of direct current of substantially constant voltage, means connected across said source comprising a voltage divider including a resistance and a glow discharge device in series relation, means responsive to a predetermined controlling influence derived from said first mentioned dynamo-electric machine for controlling the resultant energization of said pair of field windings and comprising an electronic discharge device having an anode, a cathode and at least two control members, means for connecting one of said control members to the common juncture of said resistance and said glow discharge device, and means for impressing between said cathode and the other control member a voltage which varies in accordance with said predetermined controlling influence.

4. In combination, a dynamo-electric machine comprising a field winding, means comprising a dynamo-electric machine of the armature reaction excited type for exciting said field winding and comprising a pair of field windings connected to develop opposing magnetomotive forces, a source of direct current of substantially constant voltage, a voltage divider connected across said source and including a serially connected resistance and a glow discharge device, means for connecting one of said pair of field windings directly across said source, means for variably energizing the other of said pair of field windings in response to said controlling influence and comprising an electronic discharge device having an anode, a cathode and at least two control members, the anode and cathode being connected to said source, means for connecting one of said control members to the common juncture of said resistance and said glow discharge device, and means for impressing on the other control member a potential which varies in accordance with said controlling influence.

5. In combination, a dynamo-electric machine comprising an armature winding and a field winding, means comprising a dynamo-electric machine of the armature reaction excited type for exciting said field winding and comprising a pair of field windings connected to develop opposing magnetomotive forces, a source of direct current of substantially constant voltage, means connected across said source including a serially connected resistance and a glow discharge device, means responsive to the armature voltage of the first mentioned dynamo-electric machine for controlling the resultant energization of said pair of field windings and including an electronic discharge device comprising an anode, a cathode and two control members, the anode and cathode being connected to said source, means for connecting one of said pair of field windings directly across said source, means for connecting one of said control members to the common juncture of said resistance and said glow discharge device, a voltage divider connected across said armature winding, means for impressing a relatively positive potential derived from the second mentioned voltage divider on said one control member, and means for impressing on the other control member a relatively negative potential derived from the second mentioned voltage divider.

6. In combination, a dynamo-electric machine having an armature and a field winding, means comprising a dynamo-electric machine of the armature reaction excited type for energizing said field winding and comprising a boosting field winding and a bucking field winding, a source of direct current of substantially constant voltage, means connected across said source comprising a voltage divider including a serially connected resistance and a glow discharge device, means for connecting said boosting field winding directly across said source, means for variably energizing said bucking field winding to control the armature voltage of said armature reaction excited machine and comprising an electronic discharge device having an anode-cathode circuit connected across said source and comprising two control grids, means for connecting one of said control grids to the common juncture of said resistance and said glow discharge device, a second voltage divider connected across said armature winding, means for connecting said one grid to a relatively positive potential point of said second voltage divider, and means for connecting the other control grid to a relatively negative potential point of said second voltage divider to vary the conductivity of said electronic discharge device in accordance with the voltage of said armature winding.

7. In combination, a dynamo-electric machine having an armature winding and a pair of field windings connected to develop opposing magnetomotive forces, a source of direct current, means for connecting one of said field windings directly across said source, means for variably energizing the other of said field windings to control the resultant magnetization of said machine and comprising an electric discharge device for transmitting variable amounts of current from said source to said other field winding, said electric discharge device comprising an anode, a cathode and a control member, and means for connecting said control member to said source to control the conductivity of said discharge device in response to variations of the voltage of said source thereby compensating for changes in the excitation of said one winding due to variations in the voltage of the source.

8. In combination, a dynamo-electric machine having an armature winding and a pair of field windings connected to develop opposing magnetomotive forces, a source of direct current, means for connecting one of said field windings directly across said source, means for variably energizing the other of said field windings to control the resultant magnetization of said machine and including an electric discharge device having an anode, a cathode and two grids, means for controlling the conductivity of said discharge device comprising a second discharge device connected to one of said grids, and compensating means for controlling the conductivity of the first mentioned discharge means comprising means for connecting the other grid to said source to vary the energization of said other field winding in substantial accordance with variations in the energization of said one field winding occasioned by variations in the voltage of said source.

9. In combination, a dynamo-electric machine comprising a field winding, a source of current, means for energizing said field winding in response to a predetermined controlling influence derived from said machine and comprising an electric discharge device, means for controlling the conductivity of said discharge device and including a second electric discharge device having an anode, a cathode and a pair of control grids, means for impressing on one of said control grids a voltage which varies as said controlling influence, and filtering means connected between said anode and the other control grid to absorb extraneous transient voltages occasioned by variations in the voltage of said source.

10. In combination, a dynamo-electric machine having an armature winding and a pair of field windings connected to develop opposing magnetomotive forces, a source of direct current, means for connecting one of said field windings directly across said source, means for variably energizing the other of said field windings to control the resultant magnetization of said machine and including an electric discharge device having an anode, a cathode and two grids, means for controlling the conductivity of said discharge device comprising a control circuit to produce a unidirectional voltage which varies in accordance with a predetermined controlling influence and having positive and negative terminals, means for connecting the negative terminal to one of said grids, a voltage divider connected to be energized from said source and comprising in series relation a resistance and a glow discharge valve, means for connecting the positive terminal of said control circuit to the common juncture of said resistance and said glow discharge valve, and means for connecting the other grid to an intermediate point of said resistance to control the conductivity of said electric discharge device in response to variations in the magnitude of the voltage of said source to compensate for such variations.

11. In combination, a dynamo-electric machine having a field winding, a source of direct current, means for energizing said field winding from said source and including an electric discharge device comprising an anode, a cathode and two grids, means for impressing on one of said grids a potential which varies in accordance with a predetermined controlling influence, and means for controlling said electric discharge device in response to variations in the magnitude of the voltage of said source comprising a voltage divider energized from said source and including a resistance and a glow discharge valve and comprising a connection from the other of said grids to said resistance.

FREDERICK E. CREVER.
JAMES R. KILANDER.